(12) United States Patent
Hanagan

(10) Patent No.: US 6,971,714 B1
(45) Date of Patent: Dec. 6, 2005

(54) MOTORCYCLE SEAT WITH CONVERTIBLE BACKREST

(75) Inventor: Michael W. Hanagan, Hollister, CA (US)

(73) Assignee: Corbin Pacific, Inc., Hollister, CA (US)

( * ) Notice: Subject to any disclaimer, the term of this patent is extended or adjusted under 35 U.S.C. 154(b) by 0 days.

(21) Appl. No.: 10/965,533

(22) Filed: Oct. 14, 2004

(51) Int. Cl.⁷ ................................................ B62J 1/00
(52) U.S. Cl. ............ 297/215.12; 297/243; 297/378.12; 297/215.11
(58) Field of Search ...................... 297/215.12, 215.11, 297/215.1, 243, 378.12; 280/288.4

(56) References Cited

U.S. PATENT DOCUMENTS

| | | |
|---|---|---|
| 3,822,917 A | 7/1974 | George |
| 3,913,974 A | 10/1975 | Bowen |
| 4,576,411 A | 3/1986 | Kitamura |
| 4,932,101 A | 6/1990 | Lualdi |
| 4,953,258 A | 9/1990 | Mennuto |
| 4,953,911 A | 9/1990 | Hanagan |
| 5,926,917 A | 7/1999 | Gantz |
| 6,068,334 A * | 5/2000 | Bonfilio .................. 297/215.12 |
| 6,224,081 B1 | 5/2001 | Wayman et al. |
| 6,568,699 B2 | 5/2003 | McCann |
| 6,581,243 B2 | 6/2003 | Parizel |
| 2004/0256897 A1 * | 12/2004 | Ziegler .................. 297/215.12 |

* cited by examiner

Primary Examiner—Anthony D. Barfield
(74) Attorney, Agent, or Firm—Peter L. Costas; Pepe & Hazard LLC

(57) ABSTRACT

A convertible motorcycle seat includes a backrest hinge assembly having a base plate secured to the rear portion of the platform, and an elongated pivotable arm having transversely spaced depending ears, a pivot member extending transversely of, and journalled in upstanding ears on the base plate. The pivotable arm is pivotable into an erect position extending generally vertically and into a collapsed position extending generally forwardly of the saddle. The depending ears have a cam surface including a pair of spaced recesses spaced arcuately about the pivot member with a convexly arcuate lobe therebetween. An indexing pin extends transversely of the base plate, and biasing means biases the indexing pin against the cam surfaces of the depending ears and into one of the recesses whereby the pivotable arm is firmly held in an erect position or in a collapsed position.

18 Claims, 11 Drawing Sheets

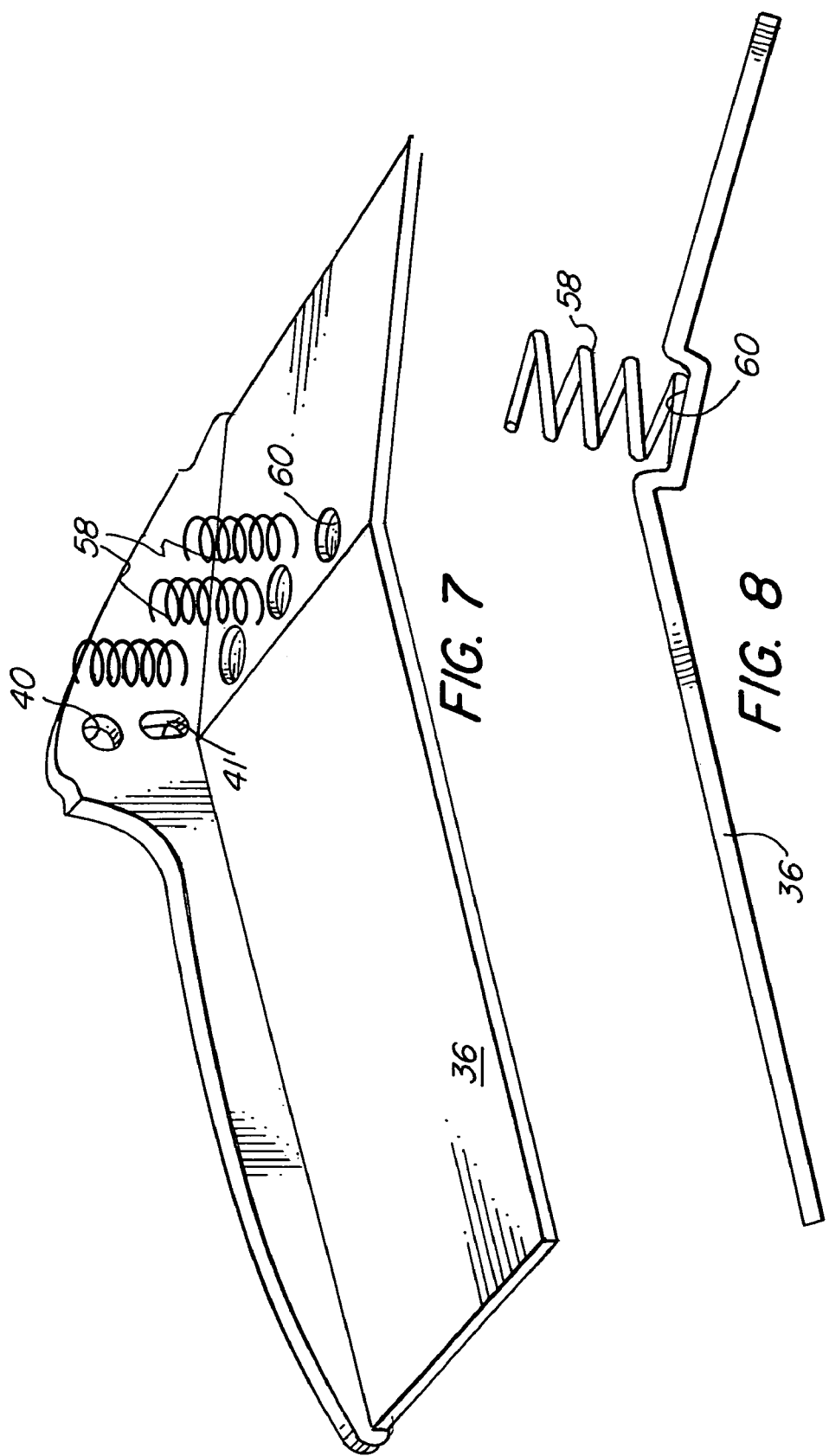

MOTORCYCLE SEAT WITH CONVERTIBLE BACKREST

BACKGROUND OF THE INVENTION

The present invention relates to convertible tandem motorcycle seats which include a pivotable backrest for the passenger.

Tandem motorcycle seats are well known and applicant has previously obtained U.S. Pat. No. 4,953,911 for a convertible motorcycle seat with a backrest which can be pivoted downwardly into a position covering the passenger seat portion. Other tandem motorcycle seats have provided an aperture formed in the cushioning material through which the arm of a backrest can be inserted into a support on the chassis and cover and permitting the readily removal of the backrest therefrom. One of the problems with pivotal backrests is that of providing some security in the positioning of the backrest in the erect position and, to a lesser extent, in the inoperative position. Moreover, some of the prior pivotable backrests have been aesthetically undesirable.

It is an object of the present invention to provide a novel tandem motorcycle seat with a pivotable backrest which is securely supported in the erect and inoperative positions.

It is also an object to provide such motorcycle seat in which the pivotable backrest blends into the contours of the remainder of the seat to provide pleasing aesthetic appearance.

Another object is to provide such a seat in which the backrest is readily moved between its erect and inoperative positions.

A further object is to provide such motorcycle seat in which the hinge mechanism occupies a relatively small space and is covered to provide a desirable aesthetic appearance.

SUMMARY OF THE INVENTION

It has now been found that the foregoing and related objects may be readily attained in a convertible motorcycle seat including an elongated saddle having a driver seat portion and a rear passenger portion. The saddle has a platform, cushioning material and a cover. Secured to the rear portion of the platform is a backrest hinge assembly having a base plate with upstanding ears spaced transversely of the platform.

An elongated pivotable arm having transversely spaced depending ears is disposed between the upstanding ears of the base plate, and a pivot member extends transversely of, and is journalled in, the upstanding ears. The pivotable arm is pivotable into an erect position extending generally vertically and into a collapsed position extending generally forwardly of the saddle.

The depending ears of the pivotable arm have a lower surface portion providing a cam surface including a pair of spaced recesses spaced arcuately about the pivot member and a convexly arcuate lobe therebetween. An indexing pin extends transversely of the base plate, and biasing means on the base plate biases the indexing pin against the cam surfaces of the depending ears and into one of the recesses whereby the pivotable arm is firmly held in an erect position or in a collapsed position. A backrest is mounted on the pivotable arm.

The biasing means conveniently comprises a compression spring bearing on the base plate and upwardly against the indexing pin, and preferably a plurality of the biasing means is provided along the length of the indexing pin. Desirably, the springs are seated in recesses in the base plate. Preferably, the recesses of the cam surfaces are concavely arcuate.

Generally, the pivotable arm has a reduced width between the upstanding ears. The backrest portion of the pivotable arm has cushioning material thereon and a cover disposed thereabout. Desirably, the backrest has a cover plate on the rear surface of the pivotable arm when the backrest is in the erect position.

The rear passenger portion of the saddle is configured to provide a recess in which the hinge assembly and backrest are disposed in the collapsed position of the pivotable arm. The backrest is dimensioned and configured to blend into the contours of the saddle about the recess.

Preferably, the rear end of the base plate has a forwardly inclined upstanding tang to which a cover plate is secured, and the plate is dimensioned and configured to blend into the first cover plate. The recesses of the cam surfaces are concavely arcuate.

BRIEF DESCRIPTION OF THE DRAWINGS

FIG. 7 is a perspective view drawn to an enlarged scale of the hinge assembly with the springs removed from the seating recesses;

FIG. 8 is a diagrammatic sectional view of a spring seated in a seating recess in the hinge base plate;

DETAILED DESCRIPTION OF THE ILLUSTRATED EMBODIMENT

Figure 1:
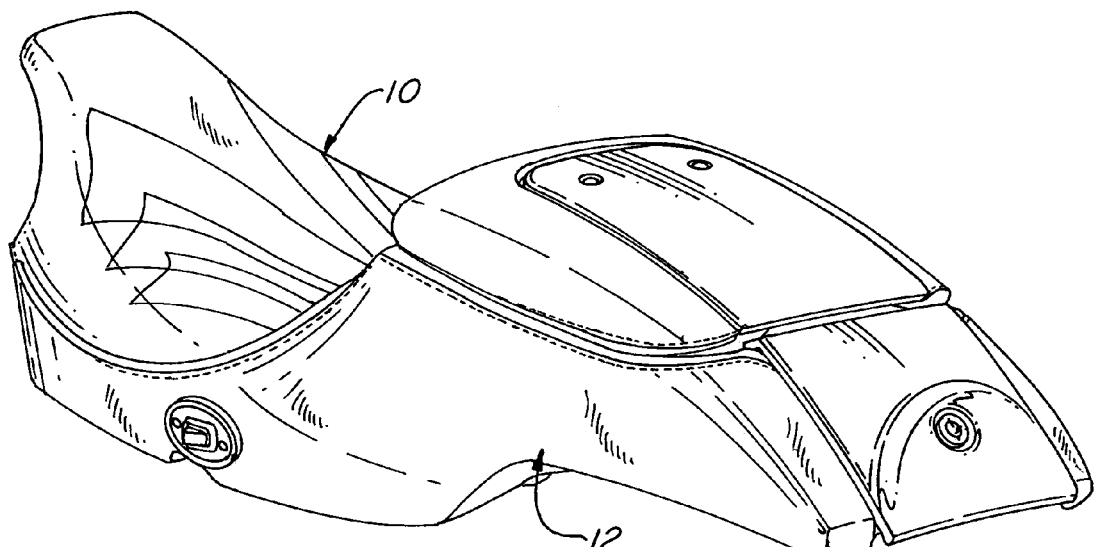
FIG. 1 is a perspective view of a motorcycle seat embodying the present invention with the backrest in its closed position.
Figure 2:
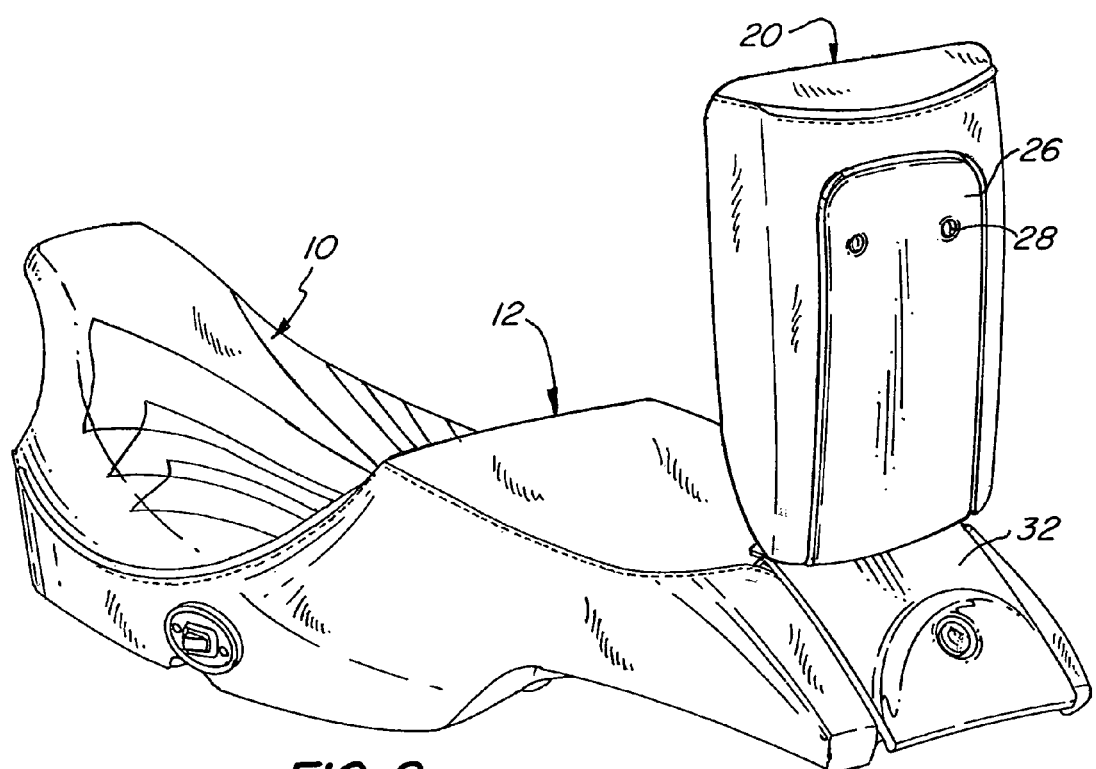
FIG. 2 is a similar view with the backrest in its operative or erect position.
Figure 3:
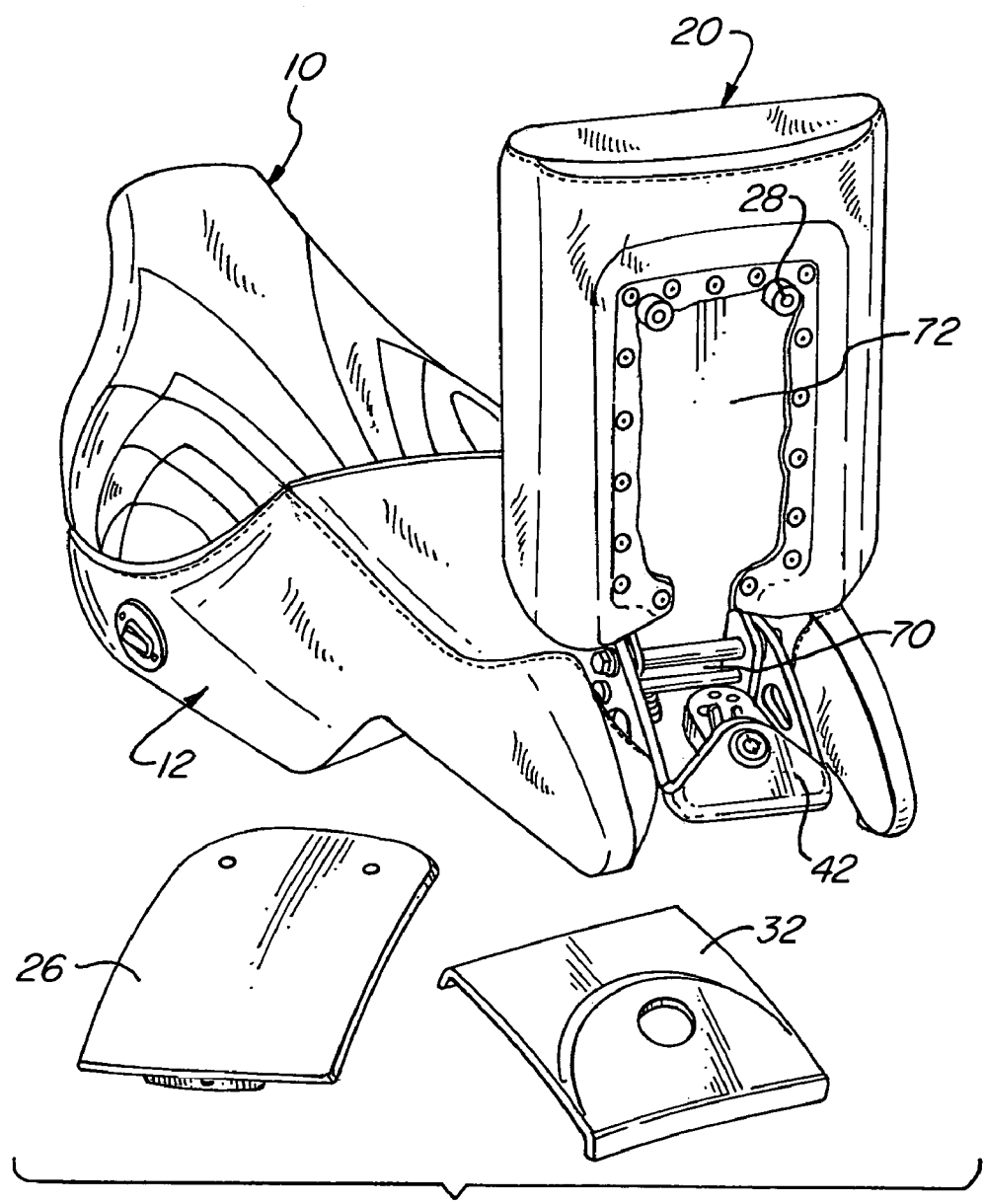
FIG. 3 is a view similar to FIG. 2 with the cover plates removed.

Turning first to FIGS. 1–3, a motorcycle seat embodying the present invention includes a driver seat portion at the front thereof generally designated by the numeral 10 and a passenger seat portion at the rear thereof generally designated by the numeral 12. Adjacent the rear thereof is a backrest generally designated by the numeral 20, which is pivotable between an erect position seen in FIG. 2 and a closed or inoperative position seen in FIG. 1 where it extends over the passenger seat portion 12.

Figure 4:
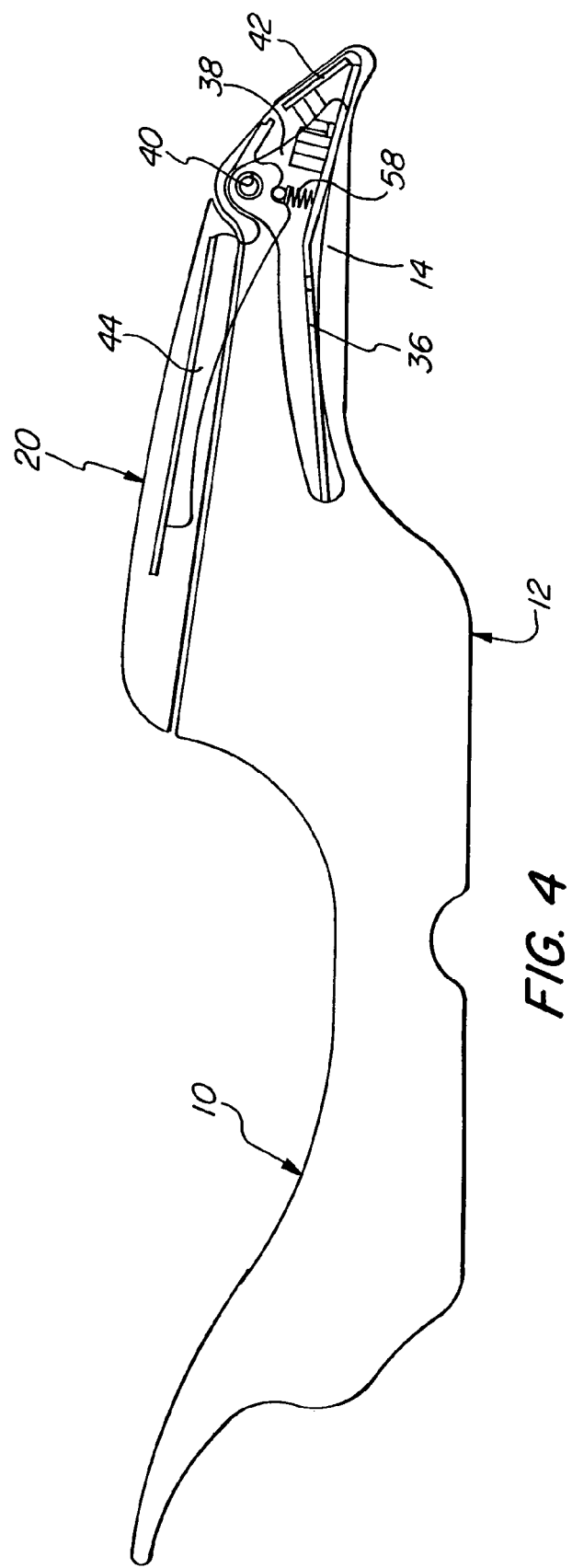
FIG. 4 is a longitudinal sectional diagrammatic view of the saddle with the backrest in the closed position.

As seen in FIG. 4, the motorcycle seat includes the underlying platform 14 which is secured to the chassis of the motorcycle (not shown). On the platform is cushioning material and a cover of leather and/or other suitable material extends over the entire exposed top and side surfaces of the motorcycle seat and is secured to the lower surface of the platform 14.

The backrest 20 also has cushioning material and a cover of leather or other suitable material. A cover plate 26 is secured by fasteners 28.

Turning next to FIGS. 4–8, the backrest 20 is pivotally supported on the platform 14 by a hinge assembly including a base plate 36 which has longitudinally upstanding ears or side walls 38 on either side thereof. The hinge base plate 36 is secured to the platform 14 by fasteners (not shown) extending through apertures 37, and it has a tang 42 at its rearward end which projects forwardly upwardly.

The ears 38 have a pair of vertically spaced apertures 40, 41 with the lower aperture 41 being vertically elongated and the upper being circular.

The hinge assembly has an elongated pivotable arm 44 with depending ears 46 along the sides at the rearward end thereof in which are provided apertures 48 the lower being vertically elongated. Extending transversely of the hinge assembly is a pivot member 48 which is journalled in the apertures 40 to provide the pivot axis about which the pivotable arm 44 is movable.

Figure 4A:
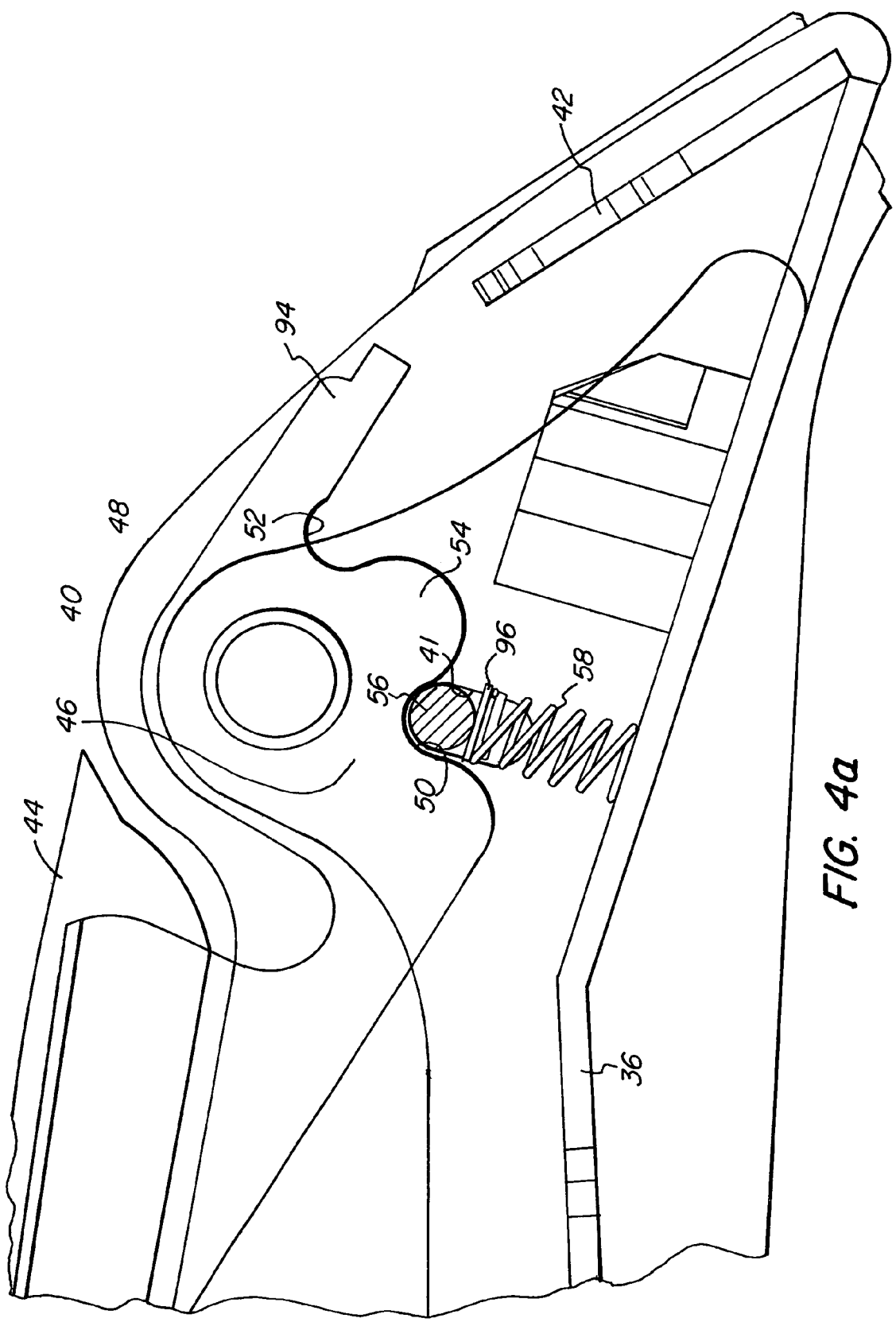
FIG. 4a is an enlarged diagrammatic view of the hinge assembly in the position of the backrest in FIG. 4.
Figure 5:
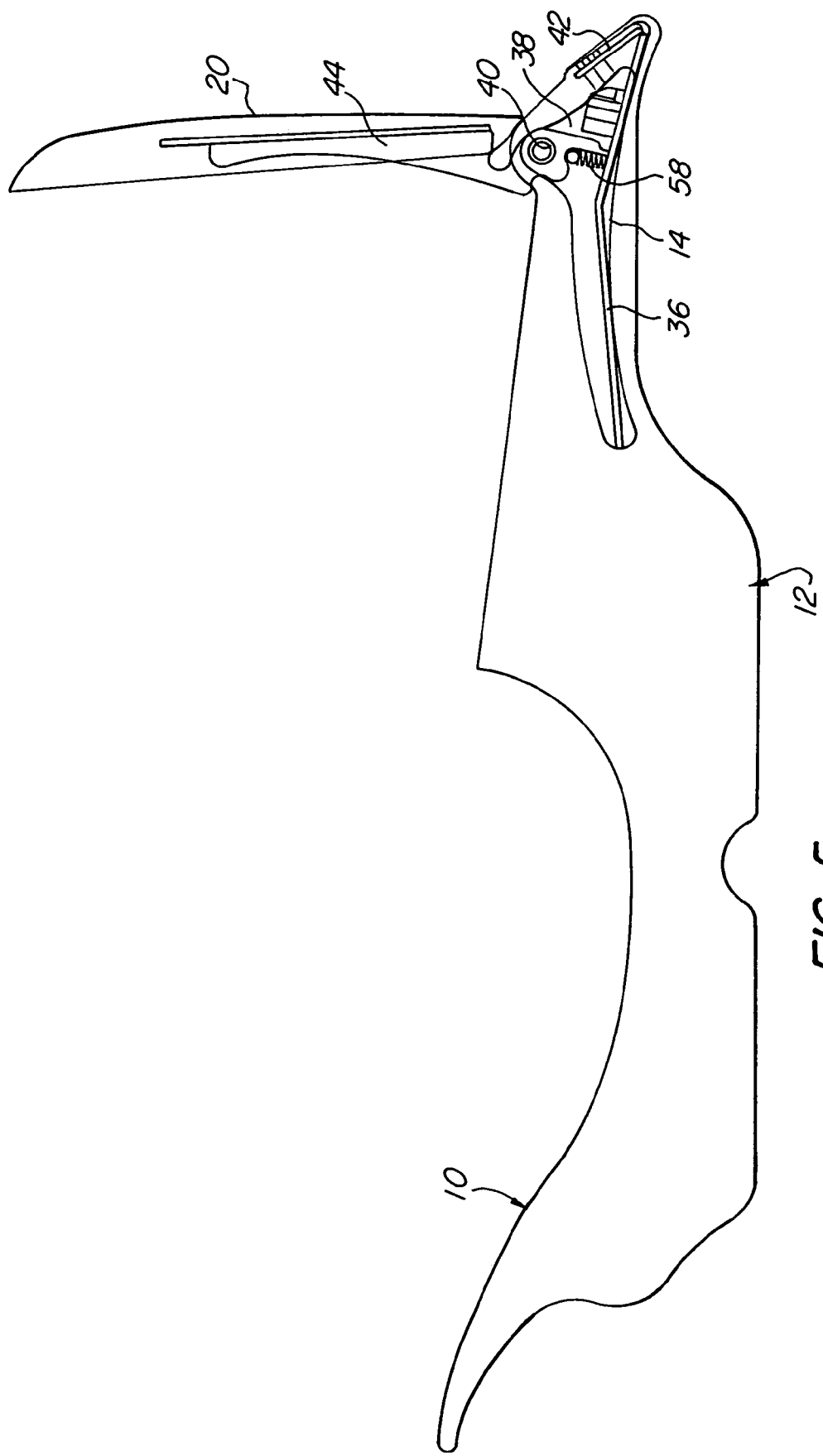
FIG. 5 is a view similar to FIG. 4 with the backrest in its erect or operative position.
Figure 5A:
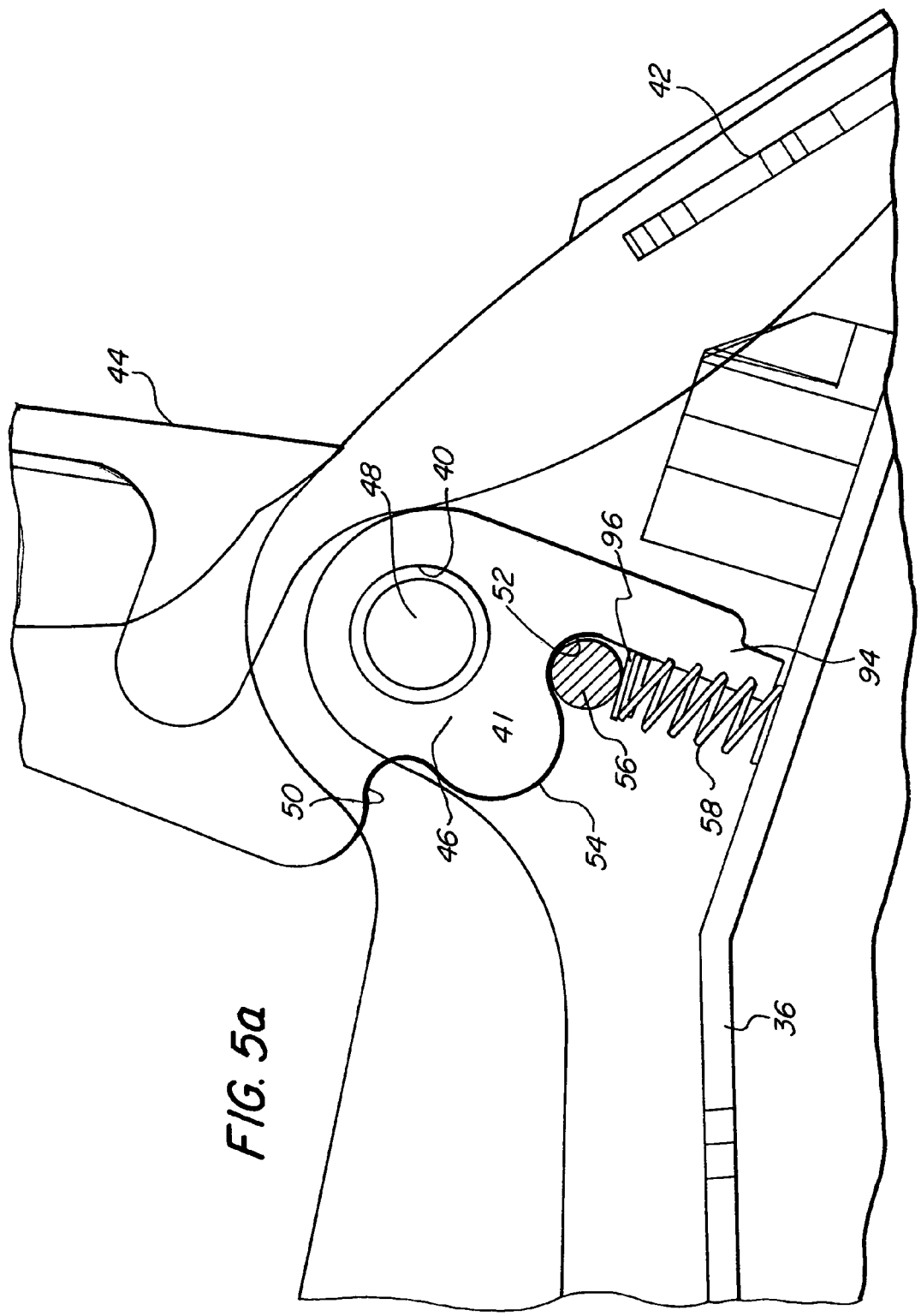
FIG. 5a is an enlarged diagrammatic view of the hinge assembly in the position of the backrest in FIG. 5.
Figure 6:
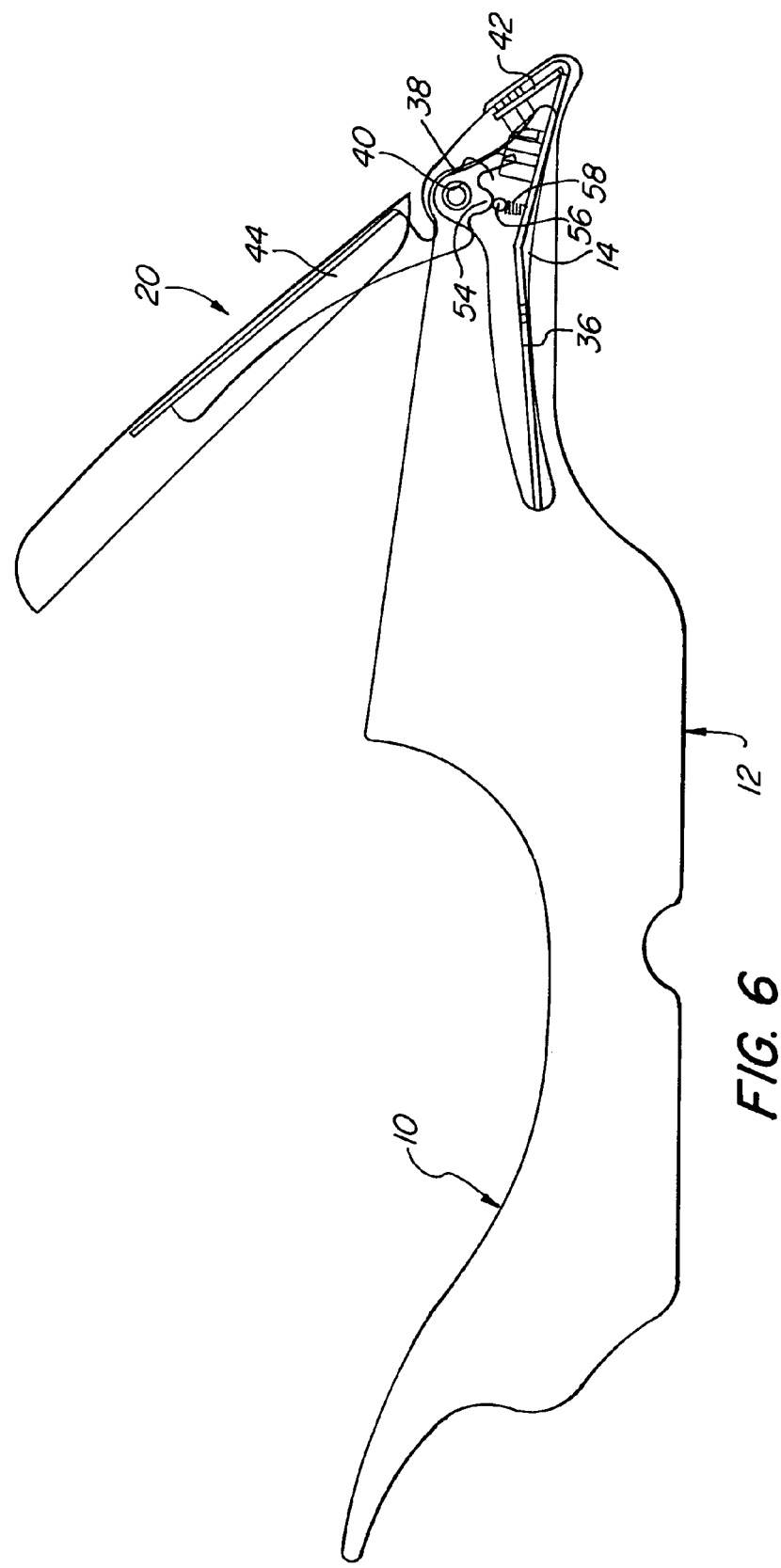
FIG. 6 is a view similar to FIGS. 4 and 5 with the backrest in an intermediate position during movement between the positions shown in FIGS. 4 and 5.
Figure 6A:
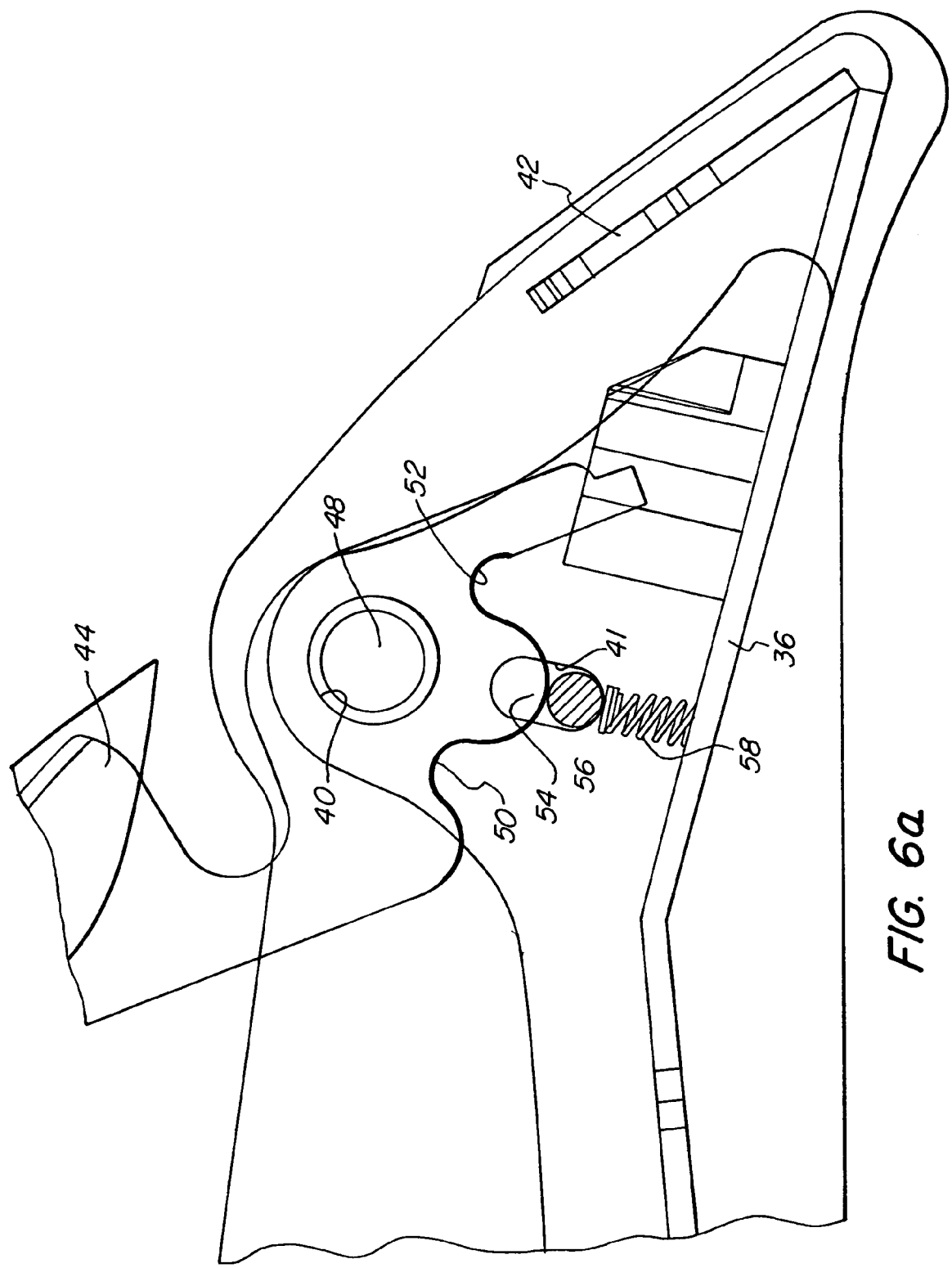
FIG. 6a is an enlarged diagrammatic view of the hinge assembly in the position of the backrest in FIG. 6.

As best seen in FIGS. 4a, 5a and 6a, the depending ears 46 have a cam surface defined by two concavely arcuate recesses 50, 52 with a convexly arcuate lobe 54 therebetween. An indexing rod 56 of circular cross section seats in the elongated apertures 41 and is biased against the cam surface by the compression springs 58 which are seated in recesses 60 formed in the base plate 36. As a result, the pivotable arm 44 is held in the closed position shown in FIGS. 4 and 4a by the seating of the indexing rod 56 in the cam recess 50. The user can grip the forward end of the backrest 20 and pivot it upwardly against the biasing pressure of the springs 58, and this causes the indexing rod 56 to move outwardly of the cam recess 50 and to travel along the surface of the cam lobe 54 as seen in FIGS. 5 and 5b until it drops into the cam recess 52 as seen in FIGS. 6 and 6a to hold the seatback 20 in its erect position.

The apertures 41 in the ears 38 are vertically elongated or oval to allow the indexing rod 56 to move upwardly and downwardly as the pivotable arm 44 cams the indexing rod 56 against the biasing pressure of the springs 58.

The pivotable arm 44 of the hinge assembly has a narrower portion 70 which extends between the upstanding ears 38 on the base plate 36 and a wider portion 72 which provides the support for the cushioning material and the cover plate 26 of the backrest 20 which is secured thereto by fasteners 28 as seen in FIG. 2.

Figure 9:
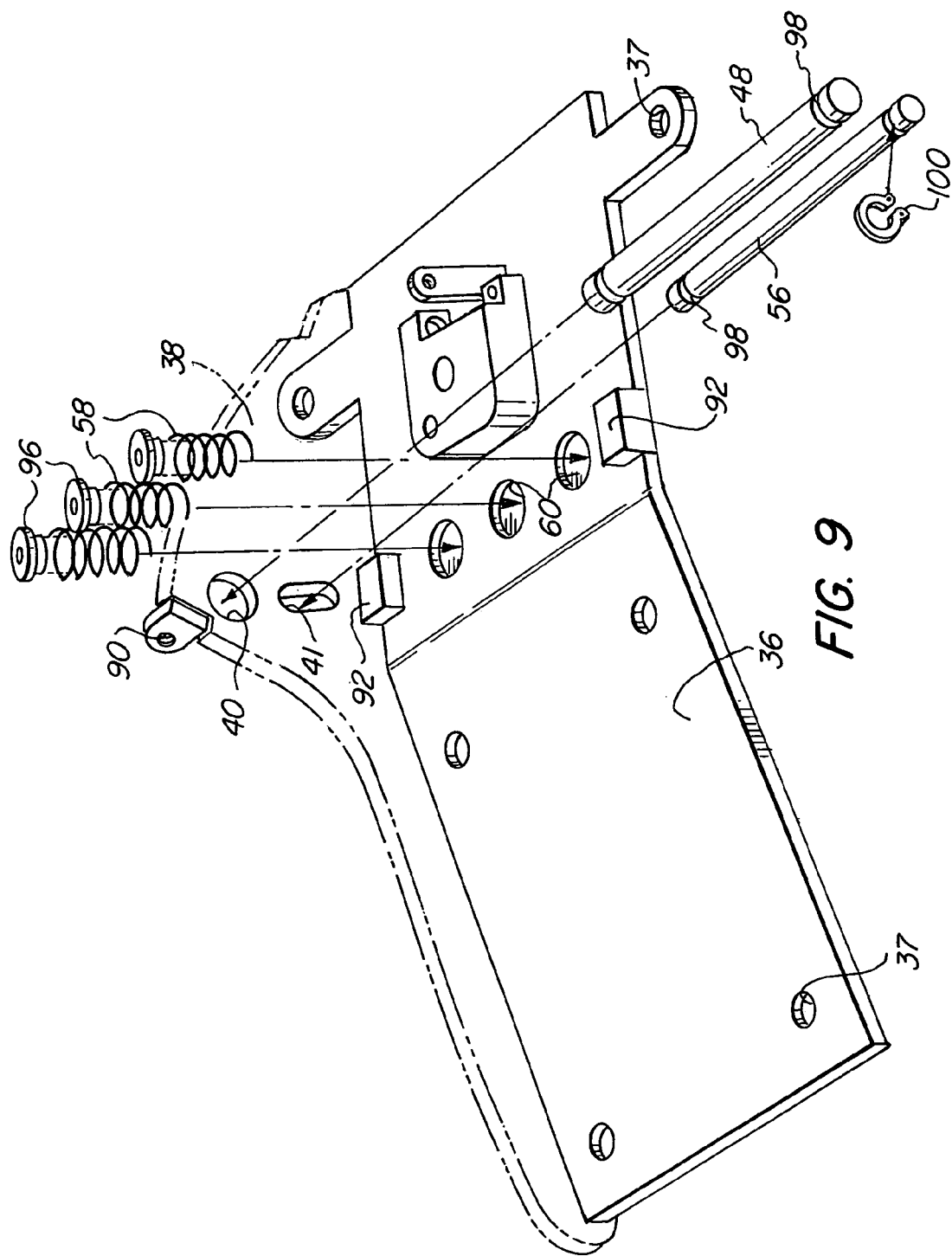
FIG. 9 is a partially exploded perspective view of various components of the hinge assembly.

As seen in FIG. 9, the ears 38 on the hinge base plate 36 have clips 90 which seat fasteners (not shown) on the cover plate 26 and the base plate 36 has apertures 37 to receive fasteners (not shown) to secure it to the saddle platform 12.

Tails 94 on the ears 46 on the pivotable arm 44 abut the blocks 92 on the base plate 36 to keep the backrest 20 from pivoting beyond the desired upright position.

To minimize wear on the indexing rod 56, bronze bushings 96 seat in the upper ends of the springs 58. The pivot rod 48 and the indexing rod 56 both have peripheral grooves 98 adjacent their ends which seat the split rings 100 which lock them in the respective apertures 40, 41.

Figure 10:
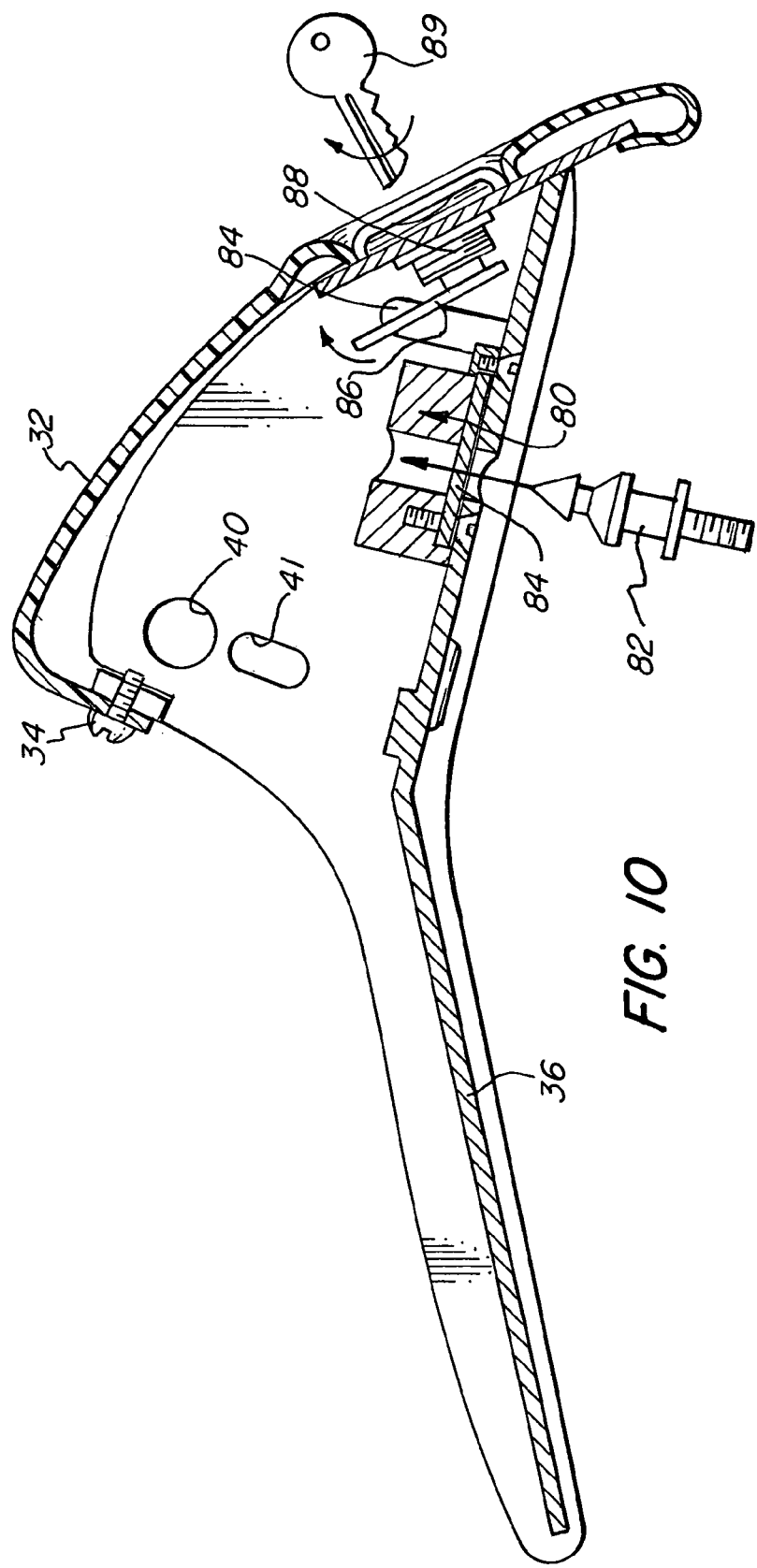
FIG. 10 is a fragmentary view in partial section of the various elements of the hinge assembly and cover.

Turning now to FIG. 10, also mounted on the base plate and generally designated by the numeral 80 is a latch which engages the latch pin 82 mounted on the motorcycle chassis (not shown). The latch lever 84 is pivotably mounted in the housing of the latch 80 and spring biased to engage between the collars of the latch pin 82. An upstanding arm 84 on the latch lever 84 is engageable by the rotatable actuator 86 on the key lock 88 which, when rotated by the key 89, pivots the latch lever 84 against the spring pressure to disengage from the latch pin 82 so that the base plate is removable therefrom.

In this manner the saddle can be locked in closed position but unlatched readily to pivot it about hinges (not shown) to provide access to other components of the cycle below the saddle.

It will be readily appreciated the other types of biasing elements can be employed including leaf springs which are under compression and gas springs. Moreover, spring guides can be provided about the lower portion of the coil springs. Although three spring units are shown in the illustrated embodiment, the number can be varied depending upon the spring pressure desired and the space available.

The base plate of the spring assembly could be eliminated as a separate element by a relatively complex configuration for the platform. However, this would require substantial modification of the platforms which are conventionally employed, and present some problems from the standpoint of maintenance and replacement of the hinge elements.

The cover plates are conveniently molded from vacuum formed synthetic resins such as ABS, although they may also be fabricated from metal. They may have any number of finishes that match, or distinguish from, the motorcycle paint color and the color of the covering for the saddle.

From the foregoing detailed description and attached drawings, the motorcycle seat of the present invention provides a highly pleasing aesthetic appearance as well as secure positioning of the backrest in the erect or in the collapsed position. When it is desired to provide a seat for a passenger, the user merely uses sufficient force to lift the forward end of the backrest upwardly against the biasing spring pressure until the indexing pin locks into the rearward recess of the cam surface.

Having thus described the invention, what is claimed is:

1. A convertible motorcycle seat including:
   (a) an elongated saddle having a driver seat portion and a rear passenger portion and including a platform, cushioning material and a cover;
   (b) a backrest hinge assembly having a base plate secured to the rear portion of said platform, said base plate having upstanding ears spaced transversely of said platform, an elongated pivotable arm having transversely spaced depending ears disposed between said upstanding ears of said base plate, a pivot member extending transversely of, and journalled in, said upstanding ears, said pivotable arm being pivotable into an erect position extending generally vertically and into a collapsed position extending generally forwardly of said saddle, said depending ears having a lower surface portion providing a cam surface including a pair of spaced recesses spaced arcuately about said pivot member with a convexly arcuate lobe therebetween, an indexing pin extending transversely of said base plate, and biasing means on said base plate biasing said indexing pin against said cam surfaces of said depending ears and into one of said recesses whereby said pivotable arm is firmly held in an erect position or in a collapsed position; and
   (c) a backrest mounted on said pivotable arm.

2. The convertible motorcycle seat in accordance with claim 1 wherein said biasing means comprises a compression spring bearing on said base plate and upwardly against said indexing pin.

3. The convertible motorcycle seat in accordance with claim 1 wherein a plurality of said biasing means is provided along the length of said indexing pin.

4. The convertible motorcycle seat in accordance with claim 2 wherein said spring is seated in a recess in said base plate.

5. The convertible motorcycle seat in accordance with claim 1 wherein said pivotable arm has a reduced width between said upstanding ears.

6. The convertible motorcycle seat in accordance with claim 1 wherein said backrest has cushioning material thereon about said pivotable arm and a cover disposed thereabout.

7. The convertible motorcycle seat in accordance with claim 6 wherein said backrest has a cover plate on the rear surface of said pivotable arm when said backrest is in said erect position.

8. The convertible motorcycle seat in accordance with claim 6 wherein said rear passenger portion of said saddle is configured to provide a recess in which said hinge assembly and backrest are disposed in the collapsed position of said pivotable arm.

9. The convertible motorcycle seat in accordance with claim 8 wherein said backrest is dimensioned and configured to blend into the contours of said saddle about said recess.

10. The convertible motorcycle seat in accordance with claim 9 wherein the rear end of said base plate has a forwardly inclined upstanding tang.

11. The convertible motorcycle seat in accordance with claim 10 wherein a cover plate is secured to said upstanding tang and is dimensioned and configured to cover said hinge assembly.

12. The convertible motorcycle seat in accordance with claim 11 wherein said backrest has cushioning material thereon about said pivotable arm and a cover disposed thereabout, and a cover plate thereon configured and dimensioned to bend into said first mentioned cover plate secured to said tang.

13. The convertible motorcycle seat in accordance with claim 1 wherein said recesses of said cam surfaces are concavely arcuate.

14. A convertible motorcycle seat including:
(a) an elongated saddle having a driver seat portion and a rear passenger portion and including a platform, cushioning material and a cover;
(b) a backrest hinge assembly having a base plate secured to the rear portion of said platform, said base plate having upstanding ears spaced transversely of said platform, an elongated pivotable arm having transversely spaced depending ears disposed between said upstanding ears of said base plate, a pivot member extending transversely of, and journalled in, said upstanding ears, said pivotable arm being pivotable into an erect position extending generally vertically and into a collapsed position extending generally forwardly of said saddle, said depending ears having a lower surface portion providing a cam surface including a pair of spaced recesses spaced arcuately about said pivot member with a convexly arcuate lobe therebetween, an indexing pin extending transversely of said base plate, and a plurality of biasing means on said base plate along the length of said indexing pin biasing said indexing pin against said cam surfaces of said depending ears and into one of said recesses whereby said pivotable arm is firmly held in an erect position or in a collapsed position, said biasing means comprising compression springs; and
(c) a backrest mounted on said pivotable arm;
wherein said biasing means comprises a compression spring bearing on said base plate and upwardly against said indexing pin, said rear passenger portion of said saddle being configured to provide a recess in which said hinge assembly and backrest are disposed in the collapsed position of said pivotable arm.

15. The convertible motorcycle seat in accordance with claim 14 wherein said pivotable arm has a reduced width between said upstanding ears, and said backrest has cushioning material thereon about said pivotable arm and a cover disposed thereabout.

16. The convertible motorcycle seat in accordance with claim 15 wherein said backrest has a cover plate on the rear surface of said pivotable arm when said backrest is in said erect position.

17. The convertible motorcycle seat in accordance with wherein said backrest is dimensioned and configured to blend into the contours of said saddle about said recess, and the rear end of said base plate has a forwardly inclined upstanding tang, and a cover plate is secured to said upstanding tang, said cover plate being dimensioned and configured to cover said hinge assembly.

18. The convertible motorcycle seat in accordance with claim 14 wherein said backrest has cushioning material thereon about said pivotable arm and a cover disposed thereabout and is configured and dimensioned to bend into said first mentioned cover plate.

* * * * *